United States Patent [19]
Felty

[11] 3,906,108
[45] Sept. 16, 1975

[54] STABILIZED TRETINOIN CREAM EMULSION

[75] Inventor: Lanny G. Felty, Jackson, N.J.

[73] Assignee: Johnson & Johnson, New Brunswick, N.J.

[22] Filed: Oct. 12, 1973

[21] Appl. No.: 406,126

[52] U.S. Cl. .............................. 424/318; 424/344
[51] Int. Cl.$^2$ ........................................ A61K 31/20
[58] Field of Search ........................... 424/318, 344

[56] References Cited
UNITED STATES PATENTS

| | | | |
|---|---|---|---|
| 3,067,038 | 12/1962 | O'Connell | 424/107 |
| 3,326,733 | 6/1967 | Colegrove | 149/20 |
| 3,355,447 | 11/1967 | O'Connell | 260/209 |
| 3,623,868 | 11/1971 | Cronig | 96/48 |
| 3,659,025 | 4/1972 | Halleck | 424/361 |
| 3,717,452 | 2/1973 | Gibsen et al. | 424/361 |
| 3,729,568 | 4/1973 | Kligman | 424/318 |
| 3,741,805 | 6/1973 | Crotty et al. | 134/4 |

FOREIGN PATENTS OR APPLICATIONS

| | | | |
|---|---|---|---|
| 906,000 | 9/1962 | United Kingdom | 424/344 |
| 901,659 | 7/1962 | United Kingdom | 424/344 |

*Primary Examiner*—Albert T. Meyers
*Assistant Examiner*—Norman A. Drezin

[57] ABSTRACT

A stabilized cream emulsion of tretinoin, capable of being stored without refrigeration for long periods of time without losing therapeutic effectiveness and while maintaining the uniformity and stability of the cream, contains xanthan gum as the stabilizer.

7 Claims, No Drawings

STABILIZED TRETINOIN CREAM EMULSION

BACKGROUND OF THE INVENTION

1. Field of the Invention

The invention relates to an emulsion cream formulation of tretinoin (all trans-retinoic acid, or Vitamin A acid). More particularly, it relates to an emulsion cream formulation of tretinoin which contains xanthan gum as the stabilizer. This product is particularly advantageous for treating such dermatological disorders as acne vulgaris.

2. Description of the Prior Art

Acne vulgaris is a dermatological disorder prevalent in adolescence. It appears most commonly on the face and trunk of the patient. The basic lesion of acne is the comedo or "blackhead" of a pilosebaceous follicle. In its mildest form, only few comedos are present, but in its severe form, a multiplicity of severe, persistent comedos are present. Permanent scarring is frequently a consequence of the severe form of acne.

Acne occurs when there is a filling up of the follicle with a rather tough keratinous material. This impaction of horny material is the whitehead and blackhead. As a result of bacterial growth in these horny impactions, the follicle ruptures, initiating the inflammatory phase of the disease which takes the form of pustules, papules, cysts and nodules.

A variety of methods have been used for the treatment of acne, including the use of peeling agents, hormone therapy for female patients, antibacterial therapy and general surgical skin planing.

Although the systemic administration of hormones and antibacterials have been used with some success, until recently none of the topical treatments have been particularly effective.

Vitamin A acid (tretinoin) has been applied topically, (Beer, Von P., "Untersuchungen ueber die Wirkung der Vitamin A-Saeure," *Dermatologica*, 124: 192–195, March, 1962 and Stüttgen, G., Zur Lokalbehandlung von Keratosen mit Vitamin A-Saeure," *Dermatologica*, 124: 65–80, February, 1962) in those hyperkeratotic disorders which are responsive to hugh oral doses of Vitamin A. Among those treated by Beer and Stüttgen were patients with acne; however, these investigators reported no effective results with Vitamin A acid on acne. British Pat. No. 906,000 disclosed a cosmetic preparation containing Vitamin A acid for the regulation of the cornification processes of human skin, but no mention is made of the use of such preparation for acne.

Recently, however, it has been demonstrated that prolonged topical application of Vitamin A acid is effective in the treatment of acne (Kligman, A. M., "Topical Vitamin A acid in Acne Vulgaris," *Arch Derm.*, 99: 469–476, April 1969). Kligman utilizes a composition in which Vitamin A acid is dispersed in a water-miscible (substantially oil- and fat-free) liquid carrier having high solvating action. The topical application of this Vitamin A acid composition causes irritation of the skin in the treated areas. See U.S. Pat. No. 3,729,568 issued Apr. 24, 1973, to Albert M. Kligman.

More recently, it has been found that acne can be effectively treated with a cream formulation containing tretinoin, or Vitamin A acid. A cream formulation is generally more acceptable to patients than the liquid vehicle from the point of view of aesthetics and ease of application. Moreover, another important advantage of the cream form of tretinoin is that it reduces the side effects normally associated with the topical application of tretinoin. These side effects, erythema, stinging and itching, may be sufficient to cause the patient to discontinue the application of tretinoin before it can be fully effective upon the acne.

While tretinoin has been marketed in cream form, the prior tretinoin creams of which I am aware were relatively unstable at room temperature and required refrigeration to ensure chemical stability.

I have discovered an emulsified cream formulation of tretinoin which has much greater stability than prior tretinoin cream formulations, permitting storage for long periods of time without refrigeration, i.e., at ambient conditions.

SUMMARY OF THE INVENTION

More particularly, I have discovered that a particular stabilizer, xanthan gum, is effective to stabilize emulsion cream formulations of tretinoin. Preferably, in order to emulsify the tretinoin cream formulation, a non-ionic emulsifier is used. Regardless of the particular emulsifier employed, physical and chemical stability is always a problem. Such emulsified systems are known to require stabilizers to prevent breaking of the emulsion over long periods of storage. While many materials, including xanthan gum, have been used as thickeners or stabilizers for cosmetic creams and lotions, I have found that xanthan gum has surprisingly superior compatibility with the tretinoin emulsion systems, thus providing a uniquely stable tretinoin emulsion cream formulation.

In general, my invention comprises a cream formulation containing a therapeutically effective amount of tretinoin, a hydrophobic material selected from the liquid and solid fatty acids, fatty alcohols, fatty acid esters, pharmaceutical grades of waxes and hydrocarbons, the latter ranging from liquids, thru semisolids such as petrolatum, to solids, and the like, a non-ionic emulsifier, xanthan gum, a preservative, an antioxidant and water. However, minor amounts of other additives may optionally be present. A general formula encompassing tretinoin cream formulations within the scope of my invention is set forth below. (Unless otherwise indicated herein, all amounts are in weight percent.)

| General Cream Formula in %w/w | |
|---|---|
| Tretinoin (all trans-retinoic acid) | 0.005 - 0.5 |
| Xanthan gum | 0.1 - 1.0 |
| Non-ionic emulsifier | 1.0 - 10.0 |
| Combination of liquid and solid fatty acids, fatty alcohols, fatty acid esters and/or other pharmaceutically acceptable hydrophobic materials | 15.0 - 50.0 |
| Preservative(s) | 0.05 - 1.0 |
| Antioxidant(s) | 0.01 - 1.0 |
| Water | q.s. to 100.0 |
| Humectant(s) | 0 - 10.0 |
| Sequestring agent(s) | 0 - 0.5 |
| Dye(s) and/or perfume oil(s) | 0 - 0.75 |
| Sunscreen(s) | 0 - 2.5 |
| Topical corticosteroid | 0 - 2.0 |

Based on accelerated aging tests, tretinoin cream emulsions in accordance with the present invention have been found to have good chemical and physical stability for at least three years at ambient temperatures (15° – 30° C). In addition, the product is aesthetically acceptable, having non-greasy properties.

DESCRIPTION OF THE PREFERRED EMBODIMENTS

A stabilized cream emulsion formulation of my invention generally comprises from about 0.005 to about 0.5 weight % of tretinoin; from about 0.1 to about 1.0 weight % xanthan gum; from about 1% to about 10% by weight of an emulsifier, preferably a non-ionic emulsifier; from about 15 to about 50 weight % of a combination of at least one normally liquid and at least one normally solid hydrophobic material selected from the fatty acids, fatty alcohols and fatty acid esters wherein the fatty acid moiety has from about 12 to about 20 carbon atoms, and pharmaceutical grades of waxes and hydrocarbons (liquid and solid); between about 0.05 and 0.75 weight % of a preservative which prevents bacterial growth in the cream; and from about 0.01 to about 1.0 weight % of an antioxidant, the balance being water. Optionally, minor amounts of such commonly used cosmetic adjuvants, additives and the like as humectants, sequestering agents, dyes, perfume oils and sunscreens may also be included. Moreover, it is also contemplated that the compositions of my invention may contain, in combination with the tretinoin, such topically active medicaments as the anti-inflammatory corticosteroids. While generally a mixture of a liquid and a solid hydrophobic material is used, this is not essential, particularly where a semisolid such as petrolatum is employed.

While the tretinoin compositions of my invention have been discussed herein primarily as suitable for use in treating acne, it will be understood that these compositions are effective generally for treating dermatological conditions where tretinoin is indicated. A preferred range for the concentration of tretinoin in the cream formulation is from about 0.02 to about 0.3% by weight, from about 0.05 to about 0.15 weight % being particularly preferred.

As indicated previously, xanthan gum and related materials have been used in cosmetic compositions (U.S. Pat. No. 3,659,025) edible oil-in-water emulsions (U.S. Pat. No. 3,067,038), aqueous gelling compositions for cleaning and sanitizing (U.S. Pat. No. 3,741,805) gelled explosive compositions (U.S. Pat. No. 3,326,733) agricultural chemical compositions (U.S. Pat. No. 3,717,452) and gelable photoprocessing solutions (U.S. Pat. No. 3,623,868). Xanthan gum is a high molecular weight polysacharide derived from *xanthamonas campestris*, its dominant hexose units being D-glucose, D-mannose and D-glucuronic acid. It is available commercially under the trademark Keltrol from Kelco Company, Clark, N.J. More detailed descriptions of this product can be found in that company's publications, e.g., Keltrol, Technical Bulletin DB No. 18, as well as in Federal Register vol. 34, No. 53 (March 19, 1969). See also the above mentioned patents, particularly U.S. Pat. Nos. 3,623,868 and 3,717,452, as well as U.S. Pat. No. 3,355,447. In the compositions of my invention it must be present in a concentration of from about 0.1 to about 1.0 % by weight. However, a concentration range for the xanthan gum between about 0.3 and about 0.5 weight % is preferred.

There is no criticality in the particular surfactant employed in the compositions of this invention. In general, however, non-ionic surfactants are preferred. Of these, the polyoxyalkylene fatty acid esters, more particularly, the polyoxyalkylene stearates are most commonly employed. These surfactants are well known in the art. Suitable examples include: polyoxyethylene 25 oxypropylene stearate, polyoxyl 40 stearate, polyethylene glycol 400 monostearate, and polyethylene glycol 600 monostearate. It is preferred to employ from about 3 to about 5 weight % of the surfactant in the compositions of the invention.

The hydrophobic (fatty) materials which can be used in the compositions of this invention are well known to those skilled in the art. They include the fatty acids, fatty alcohols and fatty acid esters, wherein the fatty acid moiety has from about 12 to about 20 carbon atoms, such as, for example, stearyl alcohol, stearic acid, isopropyl myristate and cetyl alcohol; as well as pharmaceutical grades of beeswax, including White wax, sperm wax, lanolin, mineral oil, etc. As previously indicated, cream formulations in accordance with this invention should contain at least one liquid and at least one solid ingredient from this class of materials.

Suitable preservatives for the compositions of this invention include benzyl alcohol, methyl paraben, propyl paraben, sorbic acid, etc. While as little as 0.05 weight % of these materials may be present, it is preferred that the composition contain from about 0.2 to about 0.5 weight % thereof.

The foregoing materials and the cases for their selection are well known in the art, as is the case with respect to the humectants, sequestering agents, dyes, antioxidants perfumes and sunscreens which may optionally be included in the compositions of this invention. Typical examples of such additives are propylene glycol, glycerin, sorbitol, butylated hydroxytoluene, citric acid, di-alpha tocopherol, ethylenediamine tetraacetic acid and metal salts thereof, sodium hexametaphosphate and amyl paradimethylaminobenzoate.

Examples of antiinflammatory corticosteroids which may be incorporated in the compositions of the present invention include hydrocortisone, betamethasone benzoate, desfluorotriamcinolone, dexamethasone, dexamethasone acetate, flumethasone pivalate, flumethasone valerate and deprodone proprionate. When present in the compositions of the present invention, their concentration is generally in the range of from about 0.1 to about 2.0 weight %.

In use, the compositions of the invention are applied topically to the area to be treated or protected, at regular intervals, as needed, generally from about 7 to about 21 times per week. The duration of the treatment will depend upon the nature and severity of the condition to be treated as well as the frequency of application of the composition. In general, however, improvement is noticeable within the first week or two.

The following examples are presented to further illustrate compositions of the invention without thereby limiting the scope thereof.

EXAMPLE 1

| | |
|---|---|
| Tretinoin | 0.05 |
| Xanthan gum, food grade | 0.3 |
| Polyoxyl 40 stearate, USP | 5.0 |
| Stearyl alcohol, USP | 3.0 |
| Stearic acid, USP | 19.0 |
| Isopropyl myristate, CTFA | 10.0 |
| Butylated hydroxytoluene, FCC | 0.1 |
| Citric acid, USP | 0.05 |
| Sorbic acid, NF | 0.2 |
| Purified water, USP | q.s. to 100.0 |

EXAMPLE 2

| | |
|---|---|
| Tretinoin | 0.1 |
| Xanthan gum, food grade | 0.3 |
| Polyoxyl 40 stearate, USP | 5.0 |
| Stearyl alcohol, USP | 3.0 |
| Stearic acid, USP | 19.0 |
| Isopropyl myristate, CTFA | 10.0 |
| Butylated hydroxytoluene, FCC | 0.1 |
| Sorbic acid, NF | 0.2 |
| Purified water, USP | q.s. to 100.0 |

EXAMPLE 3

| | |
|---|---|
| Tretinoin | 0.03 |
| Xanthan gum, food grade | 0.5 |
| Polyoxyl 40 stearate, USP | 5.0 |
| Stearic acid, USP | 12.0 |
| Isopropyl myristate, CTFA | 20.0 |
| Butylated hydroxytoluene, FCC | 0.1 |
| Sorbic acid, NF | 0.2 |
| Purified water, USP | q.s. to 100.0 |

EXAMPLE 4

| | |
|---|---|
| Tretinoin | 0.04 |
| Xanthan gum, food grade | 0.5 |
| Polyoxyl 40 stearate, USP | 5.0 |
| Stearic acid, USP | 12.0 |
| Isopropyl myristate, CTFA | 20.0 |
| dl-alpha tocopherol | 0.05 |
| Sodium hexametaphosphate | 0.1 |
| Sorbic acid, NF | 0.2 |
| Purified water, USP | q.s. to 100.0 |

EXAMPLE 5

| | |
|---|---|
| Tretinoin | 0.05 |
| Xanthan gum, food grade | 0.5 |
| Polyoxyl 40 stearate, USP | 5.0 |
| Stearic acid, USP | 12.0 |
| Isopropyl myristate, CTFA | 20.0 |
| Butylated hydroxytoluene, FCC | 0.1 |
| Sorbic acid, NF | 0.2 |
| Perfume oil | 0.15 |
| Purified water, USP | q.s. to 100.0 |

EXAMPLE 6

| | |
|---|---|
| Tretinoin | 0.02 |
| Xanthan gum, food grade | 0.75 |
| Polyethylene glycol 600 monostearate | 2.75 |
| Polyethylene glycol 400 monostearate | 0.75 |
| Synthetic Beeswax | 4.0 |
| Cetyl alcohol, NF | 4.5 |
| Multi-sterol extract of lanolin | 5.0 |
| Mineral oil, NF | 7.0 |
| Propylene glycol, USP | 4.0 |
| Butylated hydroxytoluene, FCC | 0.05 |
| Citric acid, USP | 0.05 |
| Sorbic acid, USP | 0.2 |
| Benzyl alcohol, NF | 0.3 |
| Perfume oil | 0.25 |
| Amyl para-dimethylaminobenzoate | 1.0 |
| Purified water, USP | q.s. to 100.0 |

EXAMPLE 7

| | |
|---|---|
| Tretinoin | 0.1 |
| Flurandrenolide | 0.05 |
| Xanthan gum | 0.3 |
| Sorbic acid | 0.2 |
| Butylated Hydroxytoluene | 0.1 |

EXAMPLE 7 – Continued

| | |
|---|---|
| Isopropyl Myristate | 10.0 |
| Polyoxyethylene 20 stearyl ether | 2.6 |
| Polyoxyethylene 2 stearyl ether | 0.3 |
| Sperm wax | 5.0 |
| Cetyl alcohol | 2.5 |
| Propylene glycol | 5.0 |
| Glyceryl monostearate | 10.0 |
| Purified water | q.s. to 100.0 |

As will be obvious to those skilled in the art, many variations and modifications may be made without departing from the spirit and scope of the invention.

What is claimed is:

1. In a tretinoin cream emulsion for topical application comprising from about 0.005 to about 0.5% by weight of tretinoin, from about 1.0 to about 10.0% by weight of an emulsifier, from about 15.0 to about 50.0% by weight of a hydrophobic material selected from the group consisting of petrolatum, beeswax, sperm wax, lanolin, mineral oil, the liquid and solid fatty acids having from about 12 to about 20 carbon atoms, fatty alcohols having from about 12 to about 20 carbon atoms, and fatty acid esters wherein the fatty acid moiety has from about 12 to about 20 carbon atoms, from about 0.05 to about 1.0% by weight of a preservative, from about 0.01 to about 1.0% by weight of an antioxidant, and water, the improvement which comprises also having therein as a stabilizer to prevent breaking of the emulsion, from about 0.1 to about 1.0% by weight of xanthan gum.

2. The product of claim 1 wherein the emulsifier is a non-ionic emulsifier.

3. The product of claim 1 which contains from about 0.3 to about 0.5% by weight of xanthan gum.

4. The product of claim 2 wherein the emulsifier is selected from the group consisting of polyoxyethylene 25 oxypropylene stearate, polyoxyl 40 stearate, polyethylene glycol 400 monostearate, polyethylene glycol 600 monostearate, polyoxyethylene 20 stearyl ether and polyoxyethylene 2 stearyl ether.

5. The product of claim 1 wherein the preservative is sorbic acid.

6. The product of claim 1 wherein the antioxidant is a member selected from the group consisting of butylated hydroxytoluene, and dl-alpha tocopherol.

7. The product of claim 1 wherein the hydrophobic material is selected from the group consisting of a stearyl alcohol, petrolatum, stearic acid, isopropyl myristate, cetyl alcohol, beeswax, sperm wax, lanolin, mineral oil and glyceryl monostearate.

* * * * *